No. 864,600. PATENTED AUG. 27, 1907.
E. BLACKNELL.
BEDSTEAD.
APPLICATION FILED MAR. 19, 1907.

WITNESSES

INVENTOR
Elihue Blacknell
BY Munn & Co
ATTORNEYS

UNITED STATES PATENT OFFICE.

ELIHUE BLACKNELL, OF FERRIS, TEXAS.

BEDSTEAD.

No. 864,600.  Specification of Letters Patent.  Patented Aug. 27, 1907.

Application filed March 19, 1907. Serial No. 363,240.

*To all whom it may concern:*

Be it known that I, ELIHUE BLACKNELL, a citizen of the United States, and a resident of Ferris, in the county of Ellis and State of Texas, have invented a new and Improved Bedstead, of which the following is a full, clear, and exact description.

The object of the invention is to provide a new and improved bedstead, which is simple and durable in construction, capable of being easily and noiselessly moved about, and conveniently passed in or out through a narrow door of a room whenever it is desired to do so.

The invention consists in novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
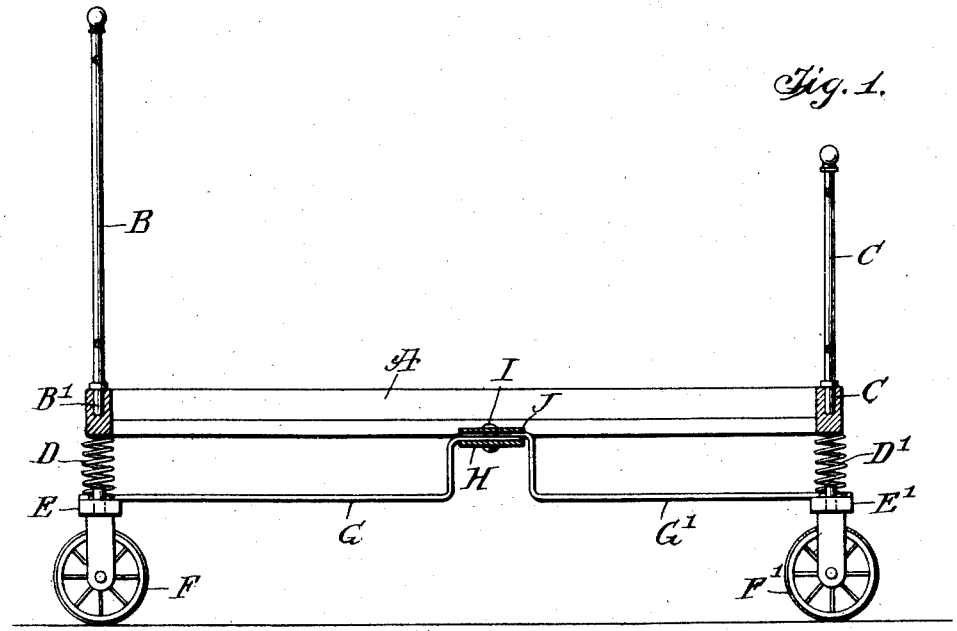
Figure 2:
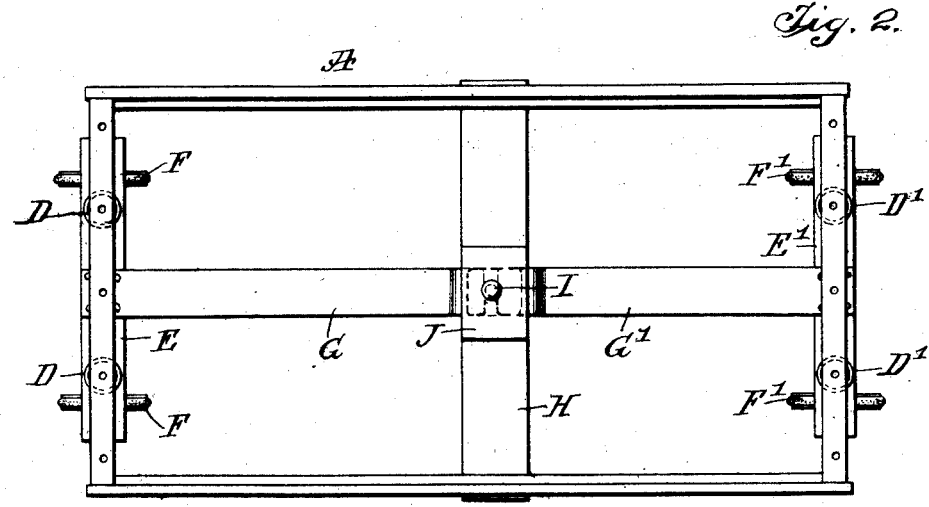
Figure 3:
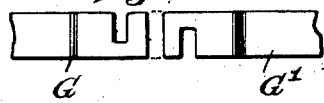

Figure 1 is a sectional side elevation of the improved bedstead; Fig. 2 is a plan view of the same, and Fig. 3 is a plan view of the inner ends of the disconnected reaches of the running gear.

The bed frame A, of an approximately rectangular shape, is adapted to support the mattress and the bedding, and the ends of the bed frame A are provided with a head B and a foot C, both removably held on the bed frame by the use of dowel pins B′, C′, engaging corresponding apertures in the ends of the bed frame A. The ends of the bed frame A rest on springs D, D′ supported on cross bars E, E′ forming part of running gear and provided with casters F, F′ having rubber tire wheels, as plainly indicated in the drawings. To the cross bars E, E′ are secured the reaches G, G′ adapted to overlap at their inner ends, which latter rest on a cross bar H secured to the underside of the bed frame A at or near the middle thereof. The inner ends of the reaches G, G′ are provided with notches $G^2$, $G^3$ (see Figs. 2 and 3), for engaging a pin I held on the cross bar H, and carrying a locking plate J overlying the overlapping inner ends of the reaches G, G′.

Now by the construction described, the bed frame A, the head B, foot C and the running gear can be readily disconnected to allow of conveniently passing the said individual parts through a narrow door, and the said parts can be readily reassembled whenever it is desired to set up the bed.

By having the caster wheels provided with rubber tires the bedstead can be noiselessly moved about, and by having the springs D, D′ interposed between the ends of the bed frame A and the cross bars E, E′ of the running gear, a very comfortable bedstead is provided.

Having thus described my invention, I claim as new and desire to secure by Letters Patent:

1. A bedstead, comprising a rectangular bed frame having a cross bar at its middle, a running gear having cross bars arranged below the end bars of the frame and a reach detachably secured to the cross bar of the bed frame, and coiled springs interposed between the ends of the frame and the cross bars of the running gear.

2. A bedstead comprising a running gear having a sectional reach, a bed frame having a removable head and a removable foot, and to which the sections of the reach of the running gear are detachably secured, and springs interposed between the ends of the said bed frame and running gear and removably connected with the latter.

3. A bedstead, comprising a bed frame, a running gear having a sectional reach, the ends of which are detachably secured to the bed frame, and springs interposed between the bed frame and running gear.

4. A bedstead, comprising a bed frame, a running gear having a sectional reach, and means for detachably connecting the sections of the reach with each other and with the frame.

5. In a bedstead the combination of a bed frame having a cross bar at its center of length, said cross bar being provided with a pin, and a running gear having a sectional reach, the ends of the sections overlapping and provided with notches engaging the pin of the cross bar of the bed frame.

6. A bedstead, comprising a bed frame having a cross bar at its middle, a running gear having cross bars arranged below the ends of the frame and a sectional reach the ends of which are detachably secured to the cross bar of the bed frame, and springs interposed between the cross bars of the running gear and the ends of the frame, the springs being detachably connected with the cross bars of the running gear.

In testimony whereof I have signed my name to this specification in the presence of two subscribing witnesses.

ELIHUE BLACKNELL.

Witnesses:
P. T. TUCKER,
W. P. PRICE.